United States Patent [19]
Dick

[11] Patent Number: 5,518,285
[45] Date of Patent: May 21, 1996

[54] FLOOR FOR SUPPORTING A LOAD

[76] Inventor: Eugene D. Dick, 70127 330 St., Kimball, Minn. 55353

[21] Appl. No.: 317,400

[22] Filed: Aug. 5, 1994

[51] Int. Cl.⁶ .................................................. B60R 13/01
[52] U.S. Cl. .................................... 296/39.2; 296/184
[58] Field of Search ............................ 296/39.1–39.3, 296/184

[56] References Cited

U.S. PATENT DOCUMENTS

| | | | |
|---|---|---|---|
| 3,480,321 | 11/1969 | Brandt et al. | 296/39.2 |
| 3,578,375 | 5/1971 | Finefrock | 296/39.2 |
| 3,652,123 | 3/1972 | Speers | 296/39.2 |
| 4,029,354 | 6/1977 | Valeri | 296/184 |
| 4,333,678 | 6/1982 | Munoz et al. | 296/39.2 |
| 4,474,404 | 10/1984 | Hagenbuch | 296/39.2 |
| 4,575,146 | 3/1986 | Markos | 296/39.2 |
| 4,763,945 | 8/1988 | Murray | 296/39.2 |
| 4,911,493 | 3/1990 | Muirhead | 296/39.1 |

FOREIGN PATENT DOCUMENTS 2331786  1/1975  Germany ............................ 296/39.2

*Primary Examiner*—Dennis H. Pedder
*Attorney, Agent, or Firm*—David J. Archer

[57] ABSTRACT

A floor is disclosed for supporting a load within a dump body of a dump truck. The floor includes a layer of material defining a surface which contacts and supports the load. The surface has a static co-efficient of friction less than 0.3 such that when the dump body is disposed in a dump mode for dumping the load, the load readily slides relative to the surface so that rapid release of the load is accomplished while inhibiting any tendency of the load to bridge, stick, freeze or hangup relative to the surface.

13 Claims, 3 Drawing Sheets

FLOOR FOR SUPPORTING A LOAD

BACKGROUND OF THE INVENTION

1. Field of the Invention

The present invention relates to a floor for supporting a load within a dump body of a dump truck. More specifically, the present invention relates to a floor for supporting a load within a dump body which is tiltable in order to release a load therefrom.

2. Information Disclosure Statement

Dump trucks typically include a dump body having a front and a rear portion. The rear portion includes a tailgate and the dump body is pivotally connected to the dump truck so that the dump body can be raised by a hydraulic lifting mechanism or the like for dumping a load through the tailgate.

In a typical dump truck the floor of the dump body is manufactured from steel and often includes a plurality of pressed sections for increasing the strength and rigidity of the floor. However, the aforementioned flooring materials necessitate the tilting of the dump body to a relatively steep angle in order to effect dumping of the load from the dump body through the tailgate.

Additionally, with certain loads of glutinous materials or the like, there exists a tendency for such materials to bridge so that unloading is accomplished with difficulty.

Another problem presents itself in cold climates when a load freezes in the dump body during transit. In this case, when the tailgate is opened and the dump body is tilted to dump the load, the load tends to hang up and stick within the dump body.

In any of the aforementioned situations, an attempt by the operator to release the load could pose a potential danger to the operator particularly, if the load is suddenly freed from the dump body.

Although operators have sometimes resorted to rapidly raising and lowering the dump body to release a load, such a procedure is time consuming and not always successful.

The present invention provides a floor for supporting a load within a dump body that permits a load to readily slide relative to the surface of the floor so that rapid and consistent release of the load is accomplished. The present invention also provides a floor for a dump body, such floor inhibiting any tendency of the load to bridge, stick, freeze or hang-up relative to the surface of the floor.

Other objects and advantages of the present invention will be readily apparent to those skilled in the art by a consideration of the detailed description contained hereinafter taken in conjunction with the annexed drawings.

SUMMARY OF THE INVENTION

The present invention relates to a floor for supporting a load within a dump body of a dump truck. The floor includes a layer of material which defines a surface which contacts and supports the load. The surface has a co-efficient of friction less than 0.3 such that when the dump body is disposed in a dump mode for dumping, the load readily slides relative to the surface so that rapid release of the load is accomplished while inhibiting any tendency of the load to bridge, stick, freeze or hang-up relative to the surface.

In a more specific embodiment of the present invention, the layer is a high molecular weight polymer or an ultra high molecular weight polymer which may be either a thermoplastic or thermosetting. In one embodiment of the present invention, the polymer is a high molecular weight polyethylene and in another embodiment of the present invention the layer is a composite.

Preferably the layer is a seamless one piece sheet.

In a specific embodiment of the present invention, the floor includes edge means rigidly secured to the dump body for supportingly engaging an edge portion of the layer.

The edge means includes a first portion which is rigidly secured to the dump body.

The edge means also includes a second portion which extends away from the first portion and a connecting portion for connecting the first and second portions together. The arrangement is such that the layer is nested on the first and second portions and abuts against the connecting portion.

The floor also includes a frame which includes longitudinal members which extend from the front to the back of the dump body. The frame also includes cross members rigidly secured to the longitudinal members and extending normally on both sides therefrom. The arrangement is such that the longitudinal and cross members co-operate together for supporting the layer thereon.

In a preferred embodiment of the present invention, the cross members are spaced from each other a distance within the range 9 to 15 inches and preferably at a distance of 12 inches.

Additionally, the floor includes an elongate fastening section which is rigidly secured to and disposed adjacent to the back of the dump body for fastening the layer to the dump body.

The fastening section is of steel having a hardness within the range 300 to 600 HB (Brinell Hardness) and preferably 450 HB. The fastening section has a depth within a range 8 to 12 inches and preferably 10 inches. The fastening section also includes a lip for sealingly engaging the tailgate which is pivotally mounted on the dump body. The arrangement is such that when the dump body is not in a dump mode, the lip sealingly engages the tailgate to prevent loss of the load therepast.

The floor also includes cover strips with each strip having a proximal and a distal end. The proximal end is rigidly secured to the dump body while the proximal end sealingly and slidingly engages the layer. The arrangement is such that when the layer expands, the strips inhibit the movement of the load from the layer under the strips while permitting thermal expansion of the layer particularly during the transportation of a load of heated material.

The cover strips define a guide slot which is disposed between the strips and the dump body. The guide slot guides the layer into location when a worn layer is being replaced by a replacement layer.

Many variations and modifications of the present invention will be readily apparent to those skilled in the art by a consideration of the detailed description contained hereinafter taken in conjunction with the annexed drawings. However, such modifications and variations fall within the spirit and the scope of the present invention as defined by the appended claims.

BRIEF DESCRIPTION OF THE DRAWINGS

Similar reference characters refer to similar parts throughout the drawings.

DETAILED DESCRIPTION OF THE DRAWINGS

Figure 1:
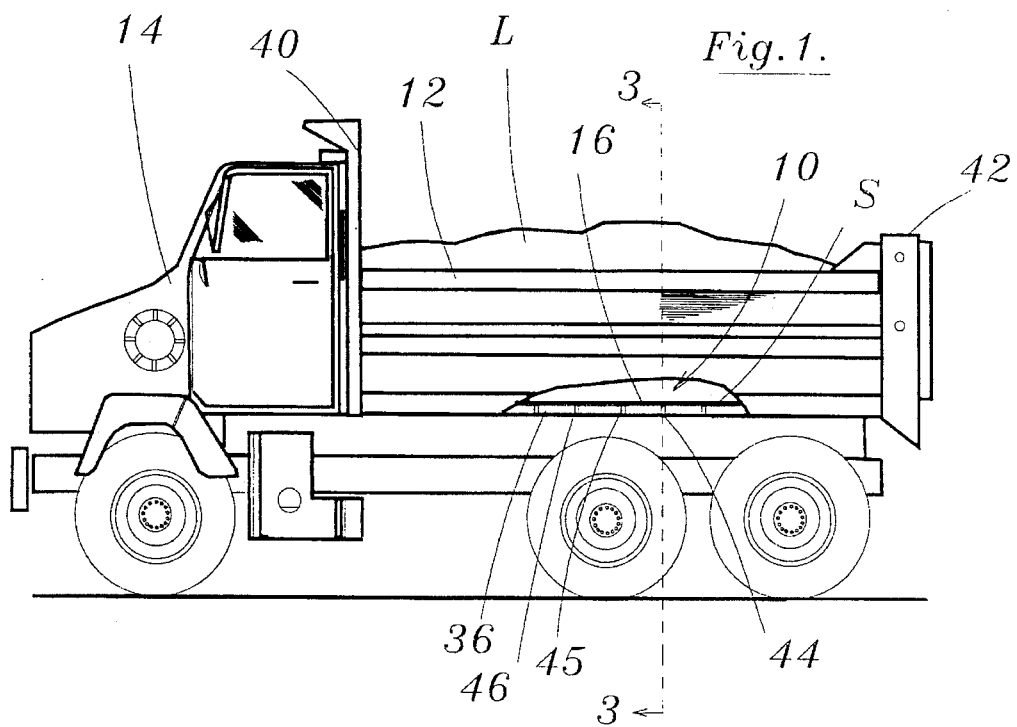
FIG. 1 is a side elevational view partially in section of a dump body of a dump truck showing a floor within the dump body for supporting a load according to the present invention.

FIG. 1 is a side elevational view partially in section of a floor generally designated 10 for supporting a load L within a dump body 12 of a dump truck 14 according to the present invention.

The floor 10 includes a layer 16 of material which defines a surface S which contacts and supports the load L.

Figure 2:
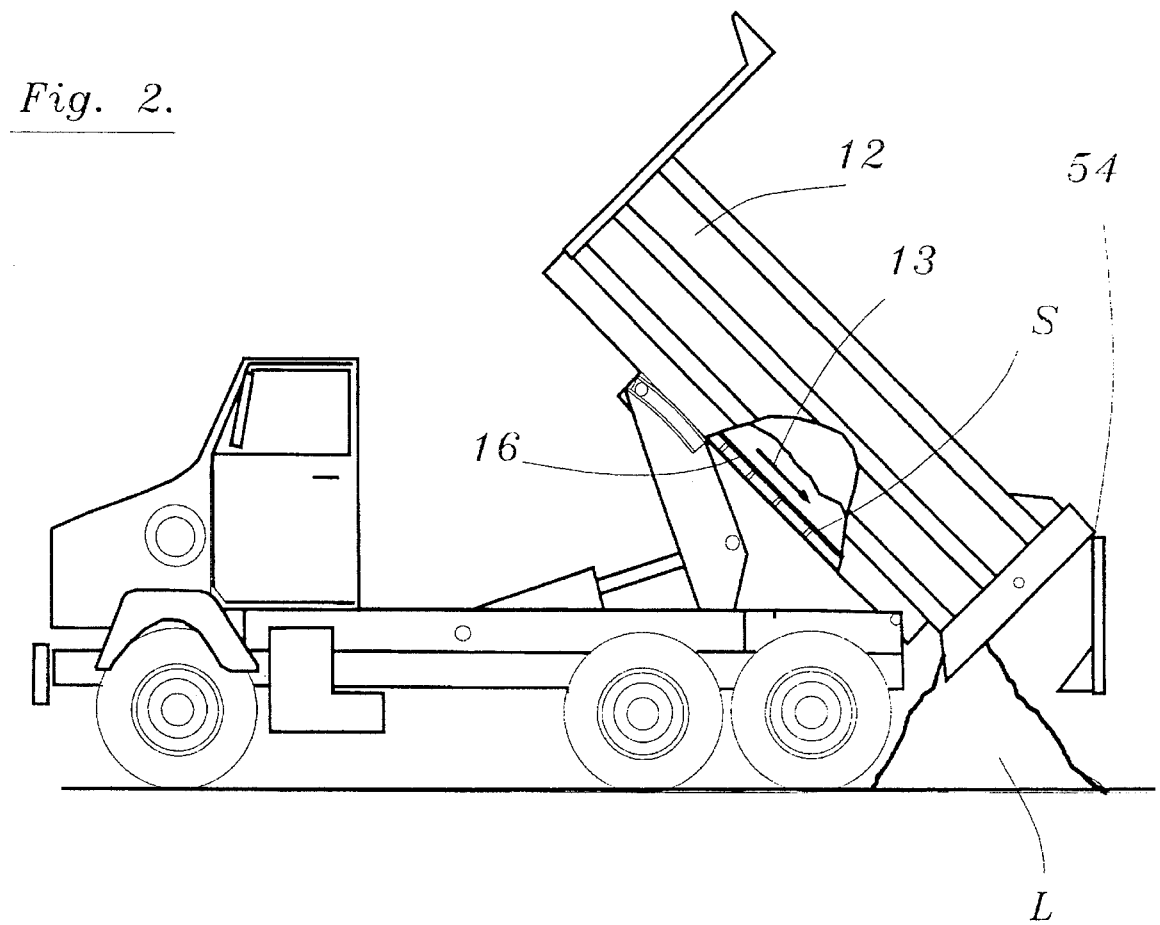
FIG. 2 is a view similar to that shown in FIG. 1 but shows the truck in the dump mode.

The surface S has a low co-efficient of friction that is less than 0.3 such that when the dump body 12 is disposed in a dump mode as shown in FIG. 2 for dumping the load L, the load L readily slides as indicated by the arrow 13 relative to the surface S so that rapid release of the load L is accomplished while inhibiting any tendency of the load to bridge, stick, freeze or hang-up relative to the surface S.

As used herein, the term "co-efficient of friction" means co-efficient of static friction for a dry surface as recited in Table 1 on page 3–26 of Marks' Standard Handbook for Mechanical Engineers. 8th Edition.

The layer 16 is a polymer which is preferably a high molecular weight polymer.

Alternatively, the layer 16 is an ultra high molecular weight polymer which may be a thermoplastic or thermosetting.

In one embodiment of the present invention the polymer is a high molecular weight polyethylene.

In another embodiment of the present invention the layer 16 is a composite.

In a preferred embodiment of the present invention, the layer 16 is a seamless one layer sheet.

Figure 3:
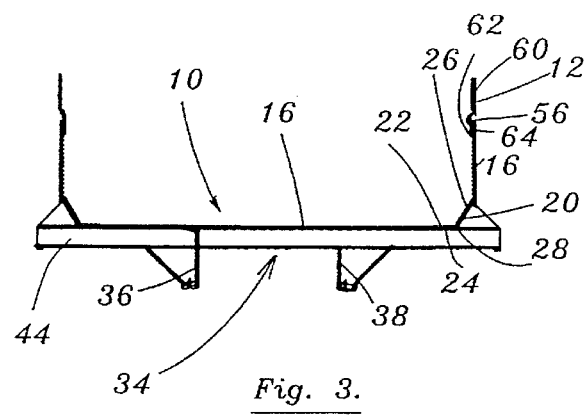
FIG. 3 is an enlarged sectional view taken on the line 3—3 of FIG. 1.

FIG. 3 is an enlarged sectional view taken on the line 3—3 of FIG. 1 More specifically, FIG. 3 shows the floor 10 further including edge means 20 rigidly secured to the dump body 12 for supportingly engaging an edge portion 22 of the layer 16.

The edge means 20 includes a first portion 24 which is rigidly secured to the dump body 12.

A second portion 26 extends away from the first portion 24 so that the first and second portions define therebetween an obtuse angle and a connecting portion 28 connects the first and second portions 24 and 26 together. The arrangement is such that the layer 16 is nested on the first and second portions 24 and 26 and abuts against the connecting portion 28 so that the first and second portions define therebetween an obtuse angle.

As shown in FIG. 3, the floor 10 also includes a frame generally designated 34. The frame 34 includes longitudinal members 36 and 38 which extend from the front 40 to the back 42 of the dump body 12 as shown in FIG. 1.

Additionally, cross members 44, 45, and 46 are rigidly secured to each longitudinal member 36 and 38 and extend normally on both sides thereof as shown in FIGS. 1 and 3. The arrangement is such that the longitudinal members 36 and 38 and the cross members 44–46 co-operate together for supporting thereon the layer 16.

Figure 4:
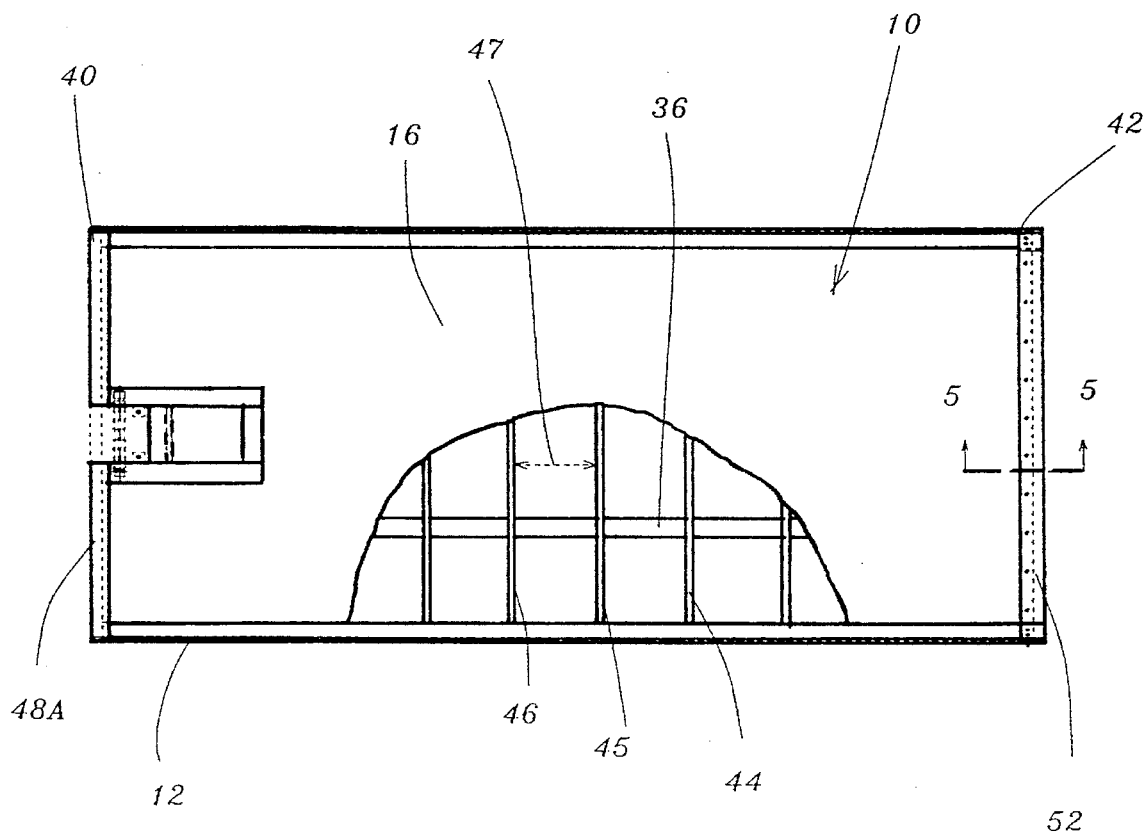
FIG. 4 is a top plan view of the floor shown in FIG. 1.

FIG. 4 is an enlarged plan view partially in section of the floor 10 shown in FIG. 1. FIG. 4 shows cross members 45 and 46 spaced from each other a distance 47 within the range 9 to 15 inches and preferably 12 inches apart.

Figure 5:
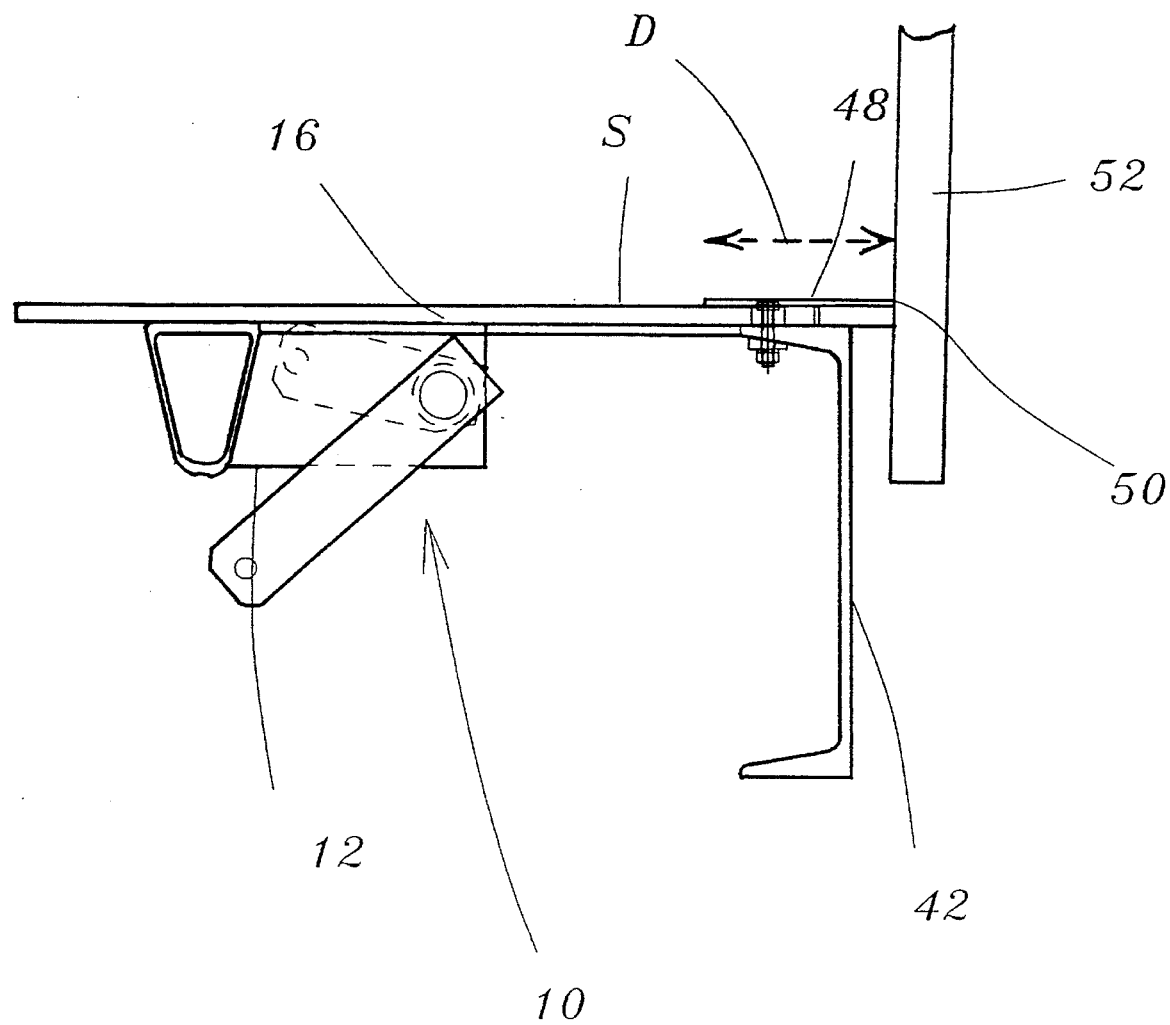
FIG. 5 is an enlarged sectional view taken on the line 5—5 of FIG. 4.

FIG. 5 is an enlarged sectional view taken on the line 5—5 of FIG. 4. As shown in FIG. 5, the floor 10 also includes an elongate fastening section 48 which is rigidly secured to and disposed adjacent to the back 42 of the dump body 12 for fastening the layer 16 to the dump body 12.

The fastening section 48 is of steel having a hardness within the range 300 to 600 HB and preferably a hardness of 450 HB.

Additionally, the fastening section 48 has a depth D within the range 8 to 12 inches and preferably 10 inches.

Also, the fastening section 48 includes a lip 50 for sealingly engaging a tailgate 52 which is pivotally mounted at 54 on the dump body 12 as shown in FIG. 2. The arrangement is such that when the dump body 12 is not in a dump mode as shown in FIG. 5, the lip 50 sealingly engages the tailgate 52 to prevent loss of the load L therepast.

As an alternative to locating the fastening section 48 at the back 42 of the dump body, the present invention also envisages an arrangement in which a fastening means 48A shown in FIG. 4 secures the layer 16 at the front 40 of the dump body and the portion of the layer 16 adjacent to the back 42 is not fastened so that the layer is free to expand when supporting heated materials.

As shown in FIG. 3, the floor 10 also includes cover strips 56. Each of the strips 56 has a proximal and a distal end 60 and 62 respectively. The proximal end 60 is rigidly secured to the side of the dump body 12. The distal end 62 sealingly and slidingly engages the layer 16 so that when the layer 16 expands, the strips 56 inhibit the movement of the load L from the layer 16 under the strips 56 while permitting thermal expansion of the layer 16 particularly during transportation of a load L of heated material.

Additionally, the cover strips 56 define a guide slot 64 disposed between the strips 56 and the dump body 12. The guide slot 64 guides the layer 16 into location when a worn layer 16 is being replaced by a replacement layer.

The present invention provides a unique floor for supporting a load within a dump truck so that the load therein may be readily released therefrom thereby inhibiting any tendency of the load to bridge, stick, freeze or hang-up relative to the surface.

What is claimed is:

1. A floor for supporting a load within a dump body of a dump truck, said floor comprising:

a seamless one piece layer of high density polyethylene material defining a surface which contacts and supports the load;

said surface having a co-efficient of friction of less than 0.3 such that when the dump body is disposed in a dump mode for dumping the load, the load readily slides relative to said surface so that rapid release of the load is accomplished while inhibiting any tendency of the load to bridge, stick, freeze or hang up relative to said surface; and cover strips, each strip having a proximal and a distal end, said proximal end being rigidly secured to the dump body, said distal ends sealingly and slidingly engaging said layer so that when said layer expands, said strips inhibit the movement of the load from said layer under said strips while permitting thermal expansion of said layer particularly during transportation of a load of heated material, each of said strips defining a guide slot disposed between said strip and the dump body for guiding said layer into location when a worn layer is being replaced by a replacement layer.

2. A floor as set in claim 1 wherein said layer is a polymer.

3. A floor as set forth in claim 2 wherein said polymer is a high density polymer.

4. A floor as set forth in claim 3 wherein said polymer is an ultra high density polymer.

5. A floor as set forth in claim 3 wherein said polymer is thermoplastic.

6. A floor as set in claim 3 wherein said polymer is thermosetting.

7. A floor as set forth in claim 1 wherein said layer is a composite.

8. A floor as set forth in claim 1 further including:

edge means rigidly secured to the dump body for supportingly engaging an edge portion of said layer.

9. A floor as set forth in claim 8 wherein said edge means includes:

a first portion rigidly secured to said dump body;

said first portion supportingly engaging said edge portion of said layer;

a second portion extending away from said layer;

said first and second portions defining therebetween an obtuse angle, the arrangement being such that said layer is nested on said first portion.

10. A floor as set forth in claim 1 wherein said floor further includes:

a frame;

said frame including:

longitudinal members which extend from the front to the back of the dump body; cross members rigidly secured to each longitudinal member and extending normally on both sides thereof, the arrangement being such that said longitudinal members and cross members co-operate together for supporting thereon said layer.

11. A floor as set forth in claim 10 wherein said cross members are spaced from each other at a distance within the range 9 to 15 inches.

12. A floor as set forth claim 1 further including:

an elongate fastening section rigidly secured to the dump body for fastening said layer to said dump body.

13. A floor as set forth in claim 12 wherein said fastening section is of steel having a hardness within the range 300 to 600 HB;

said fastening section having a depth within the range 8–12 inches;

said fastening section including:

a lip for sealingly engaging a tail gate pivotally mounted on the dump body, the arrangement being such that when the dump body is not in a dump mode, said lip sealingly engages said tailgate to prevent loss of the load therepast.

* * * * *